March 14, 1933.    H. PETSCH    1,901,770
GAS FIRED FURNACE
Filed Dec. 17, 1926    2 Sheets-Sheet 1

Inventor:
Hermann Petsch
by
J. T. Hutchinson
Attorney.

Patented Mar. 14, 1933

1,901,770

UNITED STATES PATENT OFFICE

HERMAN PETSCH, OF RECKLINGHAUSEN, GERMANY, ASSIGNOR TO THE FIRM: CARL STILL, OF RECKLINGHAUSEN, GERMANY

GAS-FIRED FURNACE

Application filed December 17, 1926, Serial No. 155,477, and in Germany December 28, 1925.

My invention relates to improvements in gas-fired furnaces adapted to use gaseous fuels of different kinds or grades, and its main object is to ensure in each case, by means of a new method of operation and special arrangements, the correct and proper supply of the different heating fluids to be used alternatively.

Gas-fired furnaces, particularly coke and gas making furnaces intended for the alternative use of heating gases of various grades (poor or rich gas for instance) are generally constructed in a manner to be operated in different ways, that is to say when a poor gas is used for heating purpose, said gas and the combustion air are both preheated, but on the other hand when using a rich gas, provision is made for the preheating of the combustion air alone. Furnaces of this character are usually provided with two separate groups of heat regenerating devices, it being understood that when using poor gas, one group of heat regenerators serves for preheating the gas and the other for preheating the air, whereas, when rich gas is used, both groups of heat regenerators are usually in operation for the preheating of the air alone.

In prior furnace constructions of this general type, when changing from the preheating of the gas to the preheating of the air in the one group of the heat regenerating devices, it has been the usual practice to allow the air thus preheated to be conducted to the combustion places or flues through the same supply and distributing passages and devices which have previously served for conducting the preheated gas.

The present invention distinguishes from these known constructions by the essential feature that, independently of the operation of the furnace, that is to say, no matter which kind of gaseous fuel is used and whether the air is preheated in one group of heat regenerators alone or in both groups, each of the different heating fluids, i. e. air, poor gas and rich gas, is always conducted through its own and definite system of distributing passages leading to the combustion places which respective passages are used exclusively for the said fluid and never for another.

An example of the present invention will now be explained in connection with the accompanying drawings in which is shown a horizontal coke retort oven having heat regenerating devices which regenerators extend along the entire battery of coke ovens.

Figure 1 of the drawings is a vertical longitudinal section showing the left half of the coke oven, taken partly through the heating wall thereof along line A—B, and partly through the oven chamber on line C—D of Figure 2.

The coke oven illustrated is a regenerative coke oven with alternating draft, in which always one half of a heating wall is heated by ascending combustion gases while the other half is passed by descending waste gases flowing off to the regenerators. The heating walls have vertical heating flues $h$ ignited from below. Beneath each half of the heating wall is a gas distributing passage $a$ with nozzles $b$, which passage is connected with a supply conduit $g$ for rich gas extending along the entire oven battery, and two sole passages $c$ and $d$. Each sole passage $c$ is connected with all adjacent heating flues $h$ at their bases through nozzles $e$. On the other hand, each sole passage $d$ is connected through branch passages $f$ with vertical passages $i$ which are arranged in the walls separating the heating flues $h$ and provided with nozzles $k$ discharging into the heating flues $h$ at different levels. In the base of the furnace below the sole passages $c$ and $d$ there are arranged two systems of regenerators $v$ and $w$ for each furnace half, which extend longitudinally of the entire oven battery. Each of these two regenerator systems $v$ and $w$ cooperates in alternating draft with the regenerator symmetrically arranged in the other furnace half. At the bottom part of the furnace structure there is provided parallel to regenerator $v$ a collecting channel $r$ in communication therewith, and, furthermore, parallel to regenerator $w$, likewise a collecting channel $s$ connected thereto. Regenerator $v$ is also connected with a gas supply conduit $m$ extending over the entire length of the battery. Above, the regenerator $v$ is connected by flues $x$ and $y$ with all the sole passages $c$ and $d$, whereas, the regenerator $w$ on the contrary is connected only with sole passages $d$ through flues $z$ (see Figure 3). Provided for each of the flues $x$, $y$ and $z$ is a shut off slide or damper $u$ which may be operated by suitable rods through closable openings $t$ at the front end of sole passages $c$ and $d$.

Figure 1:
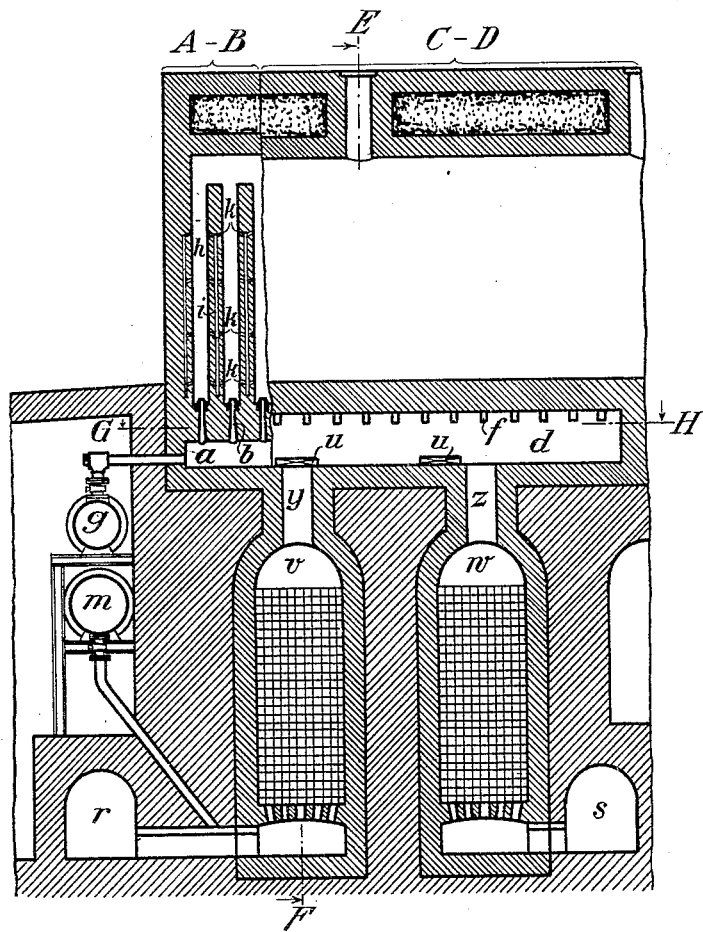
Figure 3:
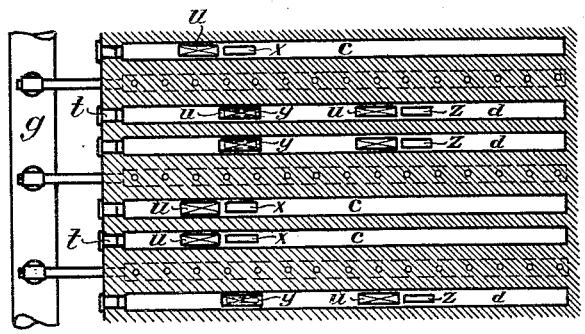
Figures 3 and 4 are representations of the same horizontal sectional view taken on line G—H of Figure 1 showing it in two different operative conditions.
Figure 2:
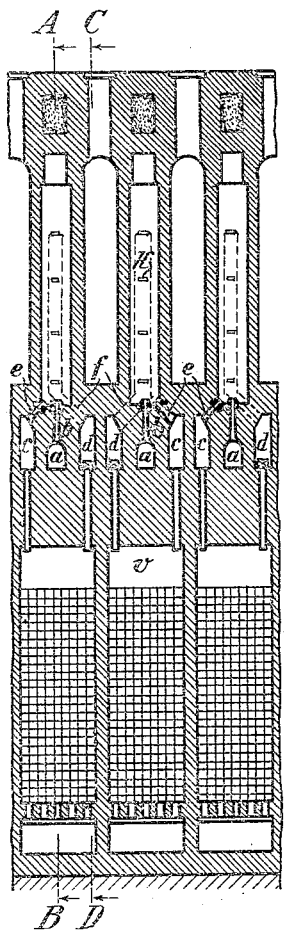
Figure 2 is a vertical cross section on line E—F of Figure 1.

Now, in order to fully explain the operation of this invention, it may be assumed as the first example that heating is effected by means of poor gas and that phase of operation prevails, where the left hand half of the heating walls illustrated in Figures 1 and 3 is heated by ascending combustion gases. In this instance the supply conduit $g$ for rich gas is shut off from the gas passages $a$, so that these particular passages are not used; regenerator $v$ now serves for preheating gas, and regenerator $w$ for preheating the combustion air. The shut off slides $u$ in this condition are in the position shown in Figure 3, that is, the flues $x$ and $z$ are open, and the flues $y$ closed. Thus the heating gas is introduced through supply conduit $m$ into regenerator $v$, where it is preheated and carried through the flues $x$ into the sole passages $c$, from which passages it is distributed through nozzles $e$ into the individual heating flues $h$. The combustion air on the other hand is supplied to and passed through the collecting channel $s$ (which is at the end of the oven battery provided with a suitable reversing valve), and then carried into regenerator $w$, where it is preheated and passed through the flues $z$ into the sole passages $d$, from which passages $d$ said air is distributed through the passages $f$ and $i$ and the nozzles $k$ into the heating flues $h$ at different heights or levels thereof. The gas entering through the nozzles $e$, and the air entering through the nozzles $k$, cause combustion and produce a heating flame which by reason of the graduated air supply ensures a very uniform and intensive heating over the whole height of the flues. The combustion gases ascend in the vertical heating flues $h$, pass into the horizontal collecting channel above the same and are finally conveyed in a downward direction into and through the other half (not shown) of the heating wall, thence passing into the respective regenerators for the purpose of heating up the same. The waste gases thus cooled are carried through the collecting channels $r$ and $s$ on the right hand side and thence to the chimney, such channels then functioning as waste gas channels.

Figure 4:
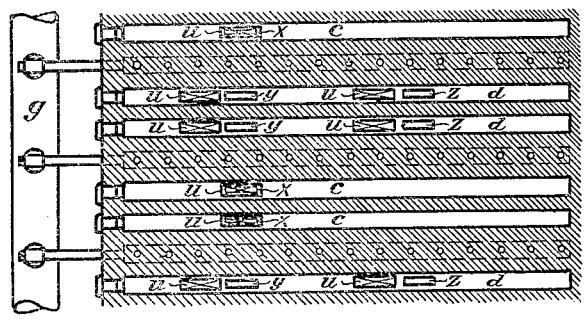

In the second example hereinafter described there is assumed that heating is effected by means of rich gas. For this purpose the connections between the rich gas supply conduit $g$ and the gas distributing passages $a$ are open, but those between the poor gas supply conduit $m$ and regenerators $v$ are closed. Regenerators $v$ and $w$ now serve together for preheating the air. The shut off slides or dampers $u$ in this instance are positioned as shown in Figure 4, that is, flues $y$ and $z$ are open, and flues $x$ closed. The sole passages $c$ are thus unused and it is to be noted that both regenerators $v$ and $w$ are connected with all sole passages $d$ alone. The combustion air is now supplied to and carried through both collecting channels $r$ and $s$ and passes into both regenerators $v$ and $w$. After being preheated all the air is conveyed from regenerators $v$ and $w$ through the flues $y$ and $z$ into the sole passages $d$ and is distributed through passages $f$ and nozzles $k$ into the heating flues, whereby combustion of the rich gas passing from the distributing passages $a$ through the nozzles $b$ takes place. The further path of the combustion gases is the same as in the first-named example for operation with poor gas.

It will be understood from the foregoing description of the construction and operation of a coke oven taken as an example, that the arrangement of heat regenerating devices, longitudinally to the battery below the sole passages $c$ and $d$ and transversely to the latter enables in a very advantageous and convenient manner to make the several combinations constituting the different methods of connecting the regenerators and sole passages. All of the slides $u$, in addition to being used as shut off devices, may also be used for regulation purposes.

The method of operation herein described allows that in every of the various cases of using different heating fluids, such, for instance, as rich gas, poor gas, and air, and under all operative conditions, that is to say, either when preheating of gas and air or when preheating of the air alone takes place, the supply or distributing passages and the discharge nozzles for any particular fluid are used for this fluid alone, and that there is never an interchange or alternate use of said passages and nozzles for different combustion fluids. The advantage attained thereby is that the supply or distributing passages, and particularly the discharge nozzles may, by proper arranging and dimensioning, be purposely adapted and adjusted to the special conditions of the respective fluid. The correct dimensions and relative sizes of the nozzles for the air, rich gas and poor gas are of the greatest importance for obtaining proper, uniform and economical heating. In addition there are several other advantageous possibilities. Only by this invention is it possible, for instance, to ensure the uniform intense heating of the example described due to the graduated air supply at various levels in all cases, no matter whether poor gas or rich gas is to be used for heating; for, it can be easily seen that this graduated air supply necessitates the exclusive use of the passages $i$, and in consequence thereof, of the sole passages $d$ for conducting combustion air in each case. Furthermore, the independence acquired by the invention as to the constructing and dimensioning of the passages and nozzles for rich and poor gas and air has the consequence that it is entirely possible to adjust the different gas or air pressures in the separate passages or conduits of the oven as required by operation necessities. The devising, for example, of a coke oven structure of masonry having seams or joints (always presenting leaks) requires that the gas pressures in the adjacent passages for gas and air be as nearly uniform as possible, so as to prevent undesired admixture of gas and air which causes local combustion. The necessary adjustments of these gas and air pressures are possible only by making the respective discharge nozzles of the proper size or dimension.

This invention is not limited to definite types of gas-fired furnaces nor to certain constructions and uses of heat regenerating devices for such furnaces. It is possible to use so-called recuperators proper as well as regenerators, or both of these together. Likewise, the arrangement or positioning of the heat regenerating devices within the furnace structure, no matter what type these heat regenerators may be, is not subjected to any limitation.

What I claim is:

1. In a gas-fired furnace, a combustion chamber, an air regenerator communicating by means of a channel with the combustion chamber at points spaced from each other along the combustion chamber, a second regenerator, a conduit communicably connecting the second regenerator with the channel at a point between the air regenerator and the points of communication of the channel with the combustion chamber, a separate conduit communicably connecting the second regenerator with the combustion chamber, and separate means for introducing fuel gas into the combustion chamber.

2. In a gas-fired furnace, a combustion chamber, an air regenerator communicating by means of a channel with the combustion chamber at points spaced from each other along the combustion chamber, a second regenerator, a conduit communicably connecting the second regenerator with the channel at a point between the air regenerator and the points of communication of the channel with the combustion chamber, a separate conduit communicably connecting the second regenerator with the combustion chamber, means for selectively supplying air through the first mentioned conduit or gas through the second mentioned conduit from said second regenerator to the combustion chamber, and separate means for introducing fuel gas into the combustion chamber.

In testimony whereof I affix my signature.

HERMANN PETSCH.